(12) United States Patent
Kodimer

(10) Patent No.: US 7,493,569 B2
(45) Date of Patent: Feb. 17, 2009

(54) SYSTEM AND METHOD FOR VISUALLY ENCODING RELATED FUNCTIONS ON A MULTI-FUNCTION DOCUMENT OUTPUT DEVICE CONTROL INTERFACE

(75) Inventor: Marianne Kodimer, Huntington Beach, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 413 days.

(21) Appl. No.: 11/452,763

(22) Filed: Jun. 14, 2006

(65) Prior Publication Data
US 2007/0291298 A1     Dec. 20, 2007

(51) Int. Cl.
G06F 13/00 (2006.01)
G06F 15/00 (2006.01)

(52) U.S. Cl. .................................. 715/779; 715/765

(58) Field of Classification Search ................ 715/202, 715/243, 763–765, 779, 864, 700; 358/1.15
See application file for complete search history.

(56) References Cited

U.S. PATENT DOCUMENTS

| | | | |
|---|---|---|---|
| 6,563,598 B1 * | 5/2003 | Johnson et al. | 358/1.15 |
| 2006/0136803 A1 * | 6/2006 | Erol et al. | 715/500 |
| 2007/0133040 A1 * | 6/2007 | Tredoux et al. | 358/1.15 |

* cited by examiner

*Primary Examiner*—Kevin Nguyen
(74) *Attorney, Agent, or Firm*—Tucker Ellis & West LLP (57) ABSTRACT

A system and method for visually encoding related functions on a multi-function document output device control interface is provided. A set of main functions are configured as hardware buttons, capable of being distinguished from each other through the use of backlighting. The color associated with the backlighting for each function button is unique and used in an associated visual interface display, such as a touch-screen interface, to distinguish secondary functions corresponding to the main function selected. The visual interface display then depicts to the associated user options or preferences as icons, tabs, or the like, each visualized in a color or shade of color associated with the primary function.

10 Claims, 5 Drawing Sheets

SYSTEM AND METHOD FOR VISUALLY ENCODING RELATED FUNCTIONS ON A MULTI-FUNCTION DOCUMENT OUTPUT DEVICE CONTROL INTERFACE

BACKGROUND OF THE INVENTION

The subject application is directed to a system and method for visually encoding related functions on a multi-function document output device control interface. More particularly, this invention is directed to a system and method for balancing the complex array of options communicated to a user via a user interface associated with multi-function document output devices.

Typically, multi-function document output devices have a user interface containing buttons or other visual indicia for high level, mutually exclusive task, such as fax, copy, scan, job queue, and templates. When one of these functions is selected, the user interface changes based on the function selected. The user interface changes to display options, settings, and features associated with the function to allow the user to configure the parameters for the selected function. Often many features and options are associated with each high level function such that the display is quite extensive and complex, containing many screens and subscreens. The user may easily get lost in navigation, and forget the basic function for which additional parameters or options are being selected. It would be advantageous to have a system by which a user is reminded throughout a configuration process as to the base function or functions that are being selected so as to allow efficient and accurate configuration.

The subject application overcomes the above mentioned problems and provides a system and method for visually encoding related functions on a multi-function document output device control interface.

SUMMARY OF THE INVENTION

In accordance with the subject application, there is provided a system and method for visually encoding related functions on a multi-function document output device control interface.

Still further, in accordance with the subject application, there is provided a system and method for balancing the complex array of options communicated to a user via a user interface associated with multi-function document output devices.

Still further, in accordance with the subject application, there is provided a system and method wherein related functions on the control interface of a multi-function document output device have corresponding appearance variant, such as color-coding or non-color related modifications.

Still further, in accordance with the subject application, there is provided a system for visually encoding related functions on a multi-function document output device control interface. The system is comprised of means adapted for receiving selection data from a dedicated input corresponding to a selected function from a plurality of functions available on a multi-function document output device. The system also includes a display generator, which includes base function indicia generator means adapted for generating base function indicia on an associated visual display corresponding to the at least one selected function. The indicia has an appearance variant corresponding to the at least one selected function. The display generator further comprises secondary display generator means adapted for generating secondary function indicia on the associated visual display corresponding to at least one secondary function of the multi-function document processing device corresponding to the selected function. The secondary function indicia has an appearance variant visually corresponding to that variant corresponding to the at least one selected function.

Still further, in accordance with the subject application, there is provided a method for visually encoding related functions on a multi-function document output device control interface. Selection data is first received from a dedicated input corresponding to a selected function from a plurality of functions available on a multi-function document output device. Base function indicia is then generated on an associated visual display corresponding to the at least one selected function, which indicia has appearance variant corresponding to the at least one selected function. The method also includes the step of generating secondary function indicia on the associated visual display corresponding to at least one secondary function of the multi-function document processing device corresponding to the at least one selected function. The secondary function indicia has an appearance variant visually corresponding to that variant corresponding to the at least one selected function.

Preferably, each appearance variant corresponds to a selected, corresponding modification to each of the base function indicia and the secondary function indicia.

In a preferred embodiment, each indicia includes an icon representative of a corresponding function associated therewith. In one embodiment, each appearance variant corresponds to a selected color coding. In another embodiment, each appearance variant corresponds to a selected, non-color-related indicia modification. Preferably, each appearance variant includes at least one of image distortion, grayscale rendering, and image hashing, such that each variant is viewable in an absence of color output information.

Still other advantages, aspects and features of the subject application will become readily apparent to those skilled in the art from the following description wherein there is shown and described a preferred embodiment of this invention, simply by way of illustration of one of the best modes best suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed a system and method for visually encoding related functions on a multi-function document output device control interface. In particular, the subject application is directed to a system and method for balancing the complex array of options communicated to a user via a user interface associated with multi-function document output devices. More particularly, the subject application is directed to a system and method wherein related functions on the control interface of a multi-function document output device have corresponding appearance variant, such as color-coding or non-color related modifications.

Figure 1:
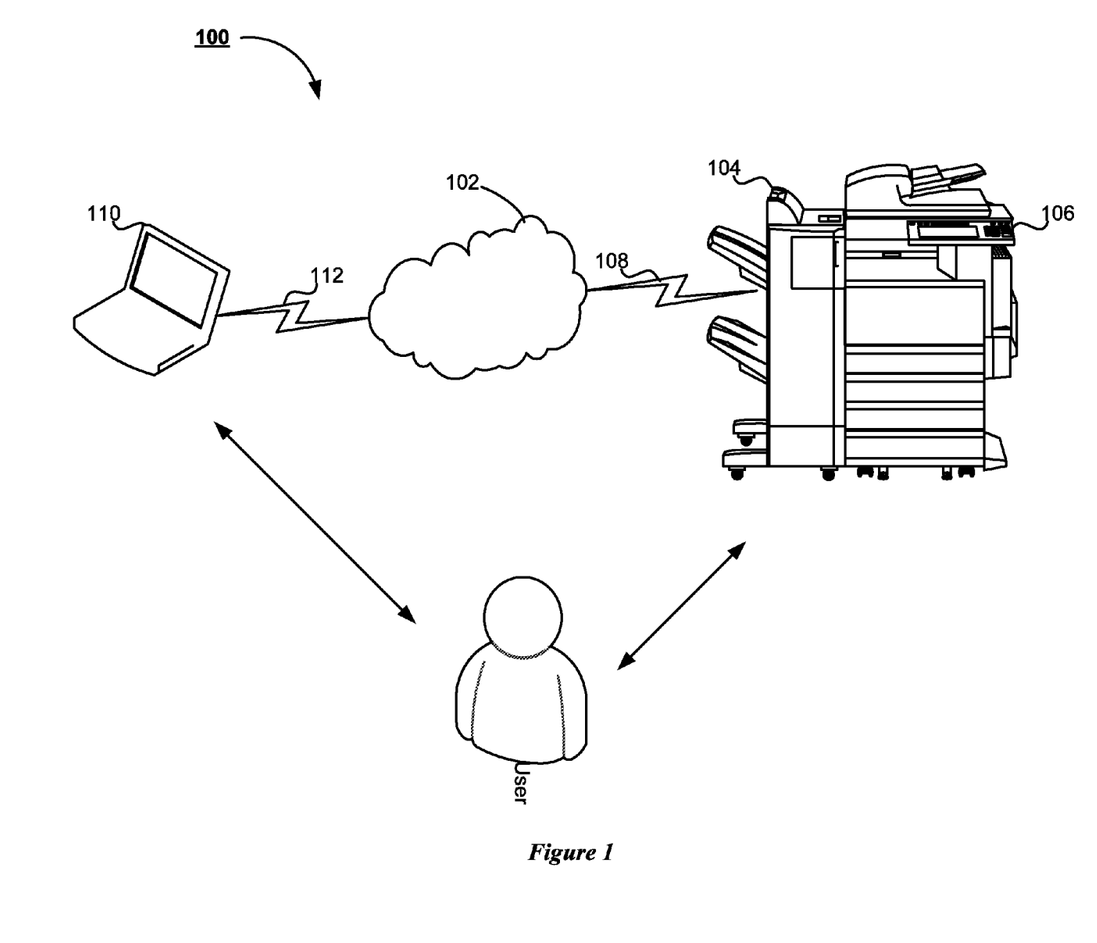
FIG. 1 which is an overall system diagram of the system for visually encoding related functions on a multi-function document output device control interface according to the subject application.

Turning now to FIG. 1, there is shown a system 100 in accordance with the subject application. As illustrated in FIG. 1, the system 100 includes a distributed computing environment, represented as a computer network 102. It will be appreciated that the computer network 102 is any distributed communications environment known in the art capable of allowing two or more electronic devices to exchange data. The skilled artisan will understand that the computer network 102 is any computer network, known in the art, including, for example and without limitation, a local area network, a wide area network, a personal area network, a virtual network, the Internet, or any combination thereof. In the preferred embodiment, the network 102 is comprised of physical layers and transport layers, as illustrated by a myriad of conventional data transport mechanisms, including, for example and without limitation, Ethernet, Token-Ring, 802.11(x), or other wire-based or wireless data communication mechanisms.

As illustrated in FIG. 1, the system 100 includes a document output device, represented in FIG. 1 as the multifunction peripheral device 104. It will be appreciated by those skilled in the art that the document output device 104 is advantageously represented in FIG. 1 as multifunction peripheral devices, suitably adapted to provide a variety of document processing services, such as, for example and without limitation, electronic mail, scanning, copying, facsimile, document creation, document management, printing, and the like. Suitable commercially available document rendering devices include, but are not limited to, the Toshiba e-Studio Series Controller. In one embodiment, the document output device 104 is suitably equipped to receive a plurality of portable storage media, including without limitation, Firewire drive, USB drive, SD, MMC, XD, Compact Flash, Memory Stick, and the like. In the preferred embodiment of the subject application, the document output device 104 further includes an associated user-interface 106, such as a touch-screen interface, LCD display, or the like, via which an associated user is able to interact directly with the document output device 104. Preferably, the associated user-interface 106 includes both hardware buttons and touch-screen icons, the context of which will be explained in greater detail below with respect to FIG. 2. The document output device 104 is in data communication with the computer network 102 via a suitable communication link 108. In accordance with the preferred embodiment of the subject application, a suitable communications link 108 employed in accordance with the subject application includes, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In the preferred embodiment of the subject application, the system 100 also includes at least one client device 110 having an associated user. Preferably, the client device 110 is communicatively coupled to the computer network 102 via a suitable communications link 112. It will be appreciated by those skilled in the art that the client device 104 is depicted in FIG. 1 as a laptop computer for illustration purposes only. As the skilled artisan will understand, the client device 110 shown in FIG. 1 is representative of any personal computing device known in the art, including, for example and without limitation, a personal computer, a computer workstation, a personal data assistant, a web-enabled cellular telephone, a smart phone, or other web-enabled electronic device suitably capable of generating and/or transmitting electronic document data to a multifunctional peripheral device. Communication between the client device 110 and the computer network 102 is advantageously accomplished via the communications link 112. The communications link 112 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. In the preferred embodiment, the client device 110 is suitably adapted to generate an electronic document using any document or image generating application known in the art. It will be appreciated by those skilled in the art that the use of at least one client device 110 is for illustration purposes only, and the subject application is capable of operations without a client device 110 in data communication with the computer network 102.

Figure 2:
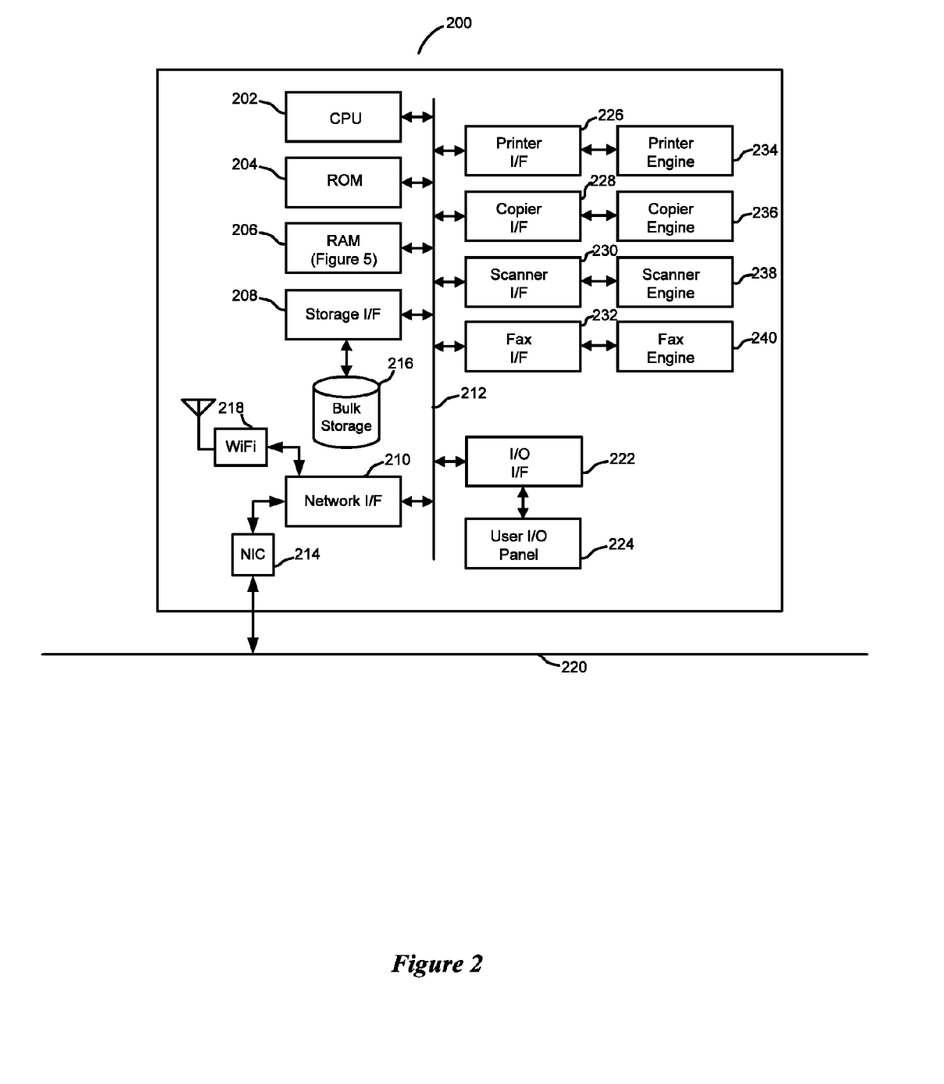
FIG. 2 is a block diagram illustrating device hardware for use in the system for visually encoding related functions on a multi-function document output device control interface according to the subject application.

Turning now to FIG. 2, illustrated is a representative architecture of a suitable device 200, shown in FIG. 1 as the document processing device 104, on which operations of the subject system 100 are completed. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the server 200.

Also included in the server 200 is random access memory 206, suitably formed of dynamic random access memory, static random access memory, or any other suitable, addressable memory system. Random access memory provides a storage area for data instructions associated with applications and data handling accomplished by processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and network subsystem 210 is suitably accomplished via a bus data transfer mechanism, such as illustrated by bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that a device 200 suitably accomplishes one or more document processing functions. Systems accomplishing more than one document processing operation are commonly referred to as multifunction peripherals or multi-function devices.

Figure 3:
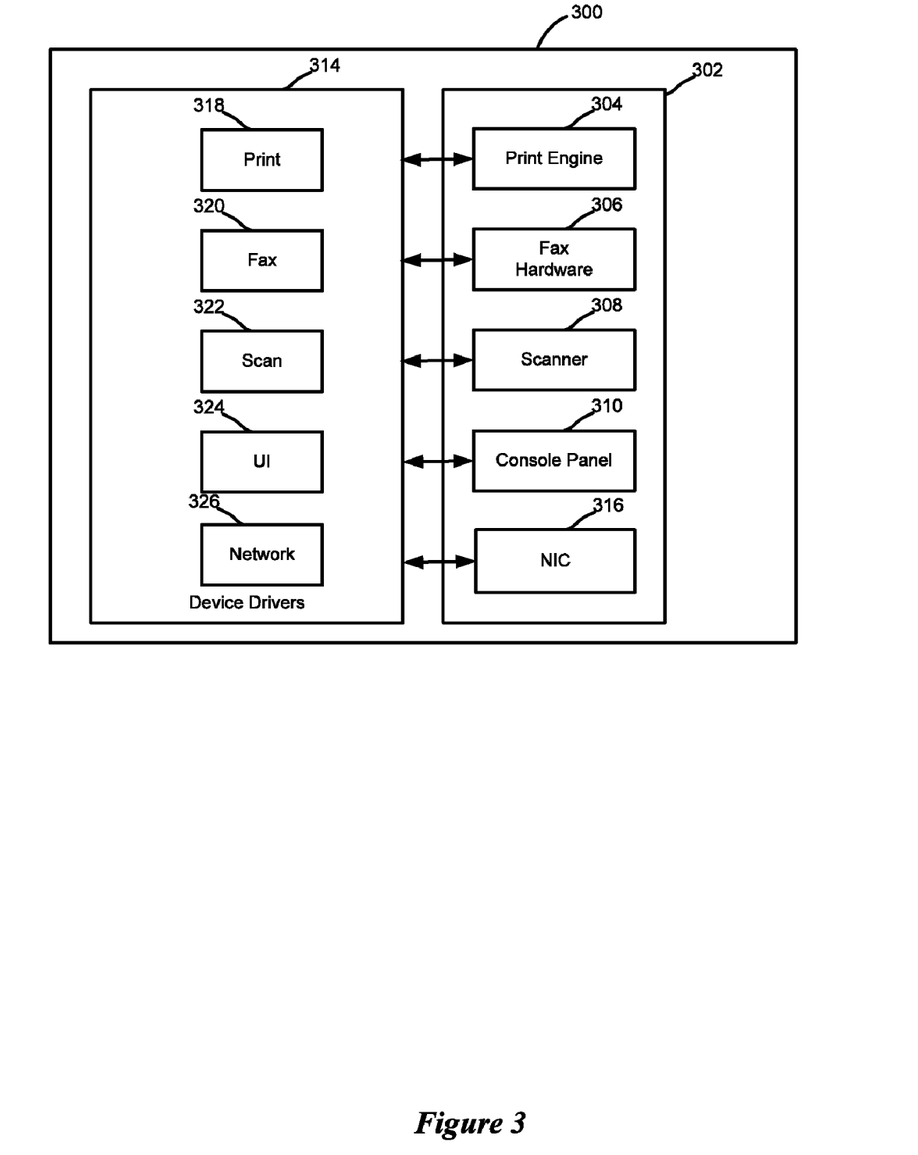
FIG. 3 is a functional block diagram illustrating the device for use in the system for visually encoding related functions on a multi-function document output device control interface according to the subject application.

Turning now to FIG. 3, illustrated is a suitable document processing device for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

Document processing engine 302 suitably includes a print engine 204, facsimile engine 206, scanner engine 308 and console panel 310. Printer engine 304 allows for output of physical documents representative of an electronic document communicated to the processing device 300. Facsimile engine 306 suitably communicates to or from external facsimile devices via a device, such as fax modem 312.

A scanner 308 suitably functions to receive hard copy documents and in turn image data corresponding thereto. A suitable user interface, such as that interface 310, suitably includes a console to allow for input receipt of instructions and display of information to an associated user. It will be appreciated that the scanner 308 is suitably used in connection with input of tangible documents into electronic form in bitmapped, vector, or page description language format, and is also suitably configured for optical character recognition. Tangible document scanning also suitably functions to facilitate facsimile output thereof.

In the illustration of FIG. 3, the document processing engine also comprises an interface 316 with a network, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with document processing engine 302. It is to be appreciated that any set or subset of document processing operations are contemplated herein. Document processors which include a plurality of available document processing options are referred to as multi-function peripherals.

Figure 4:
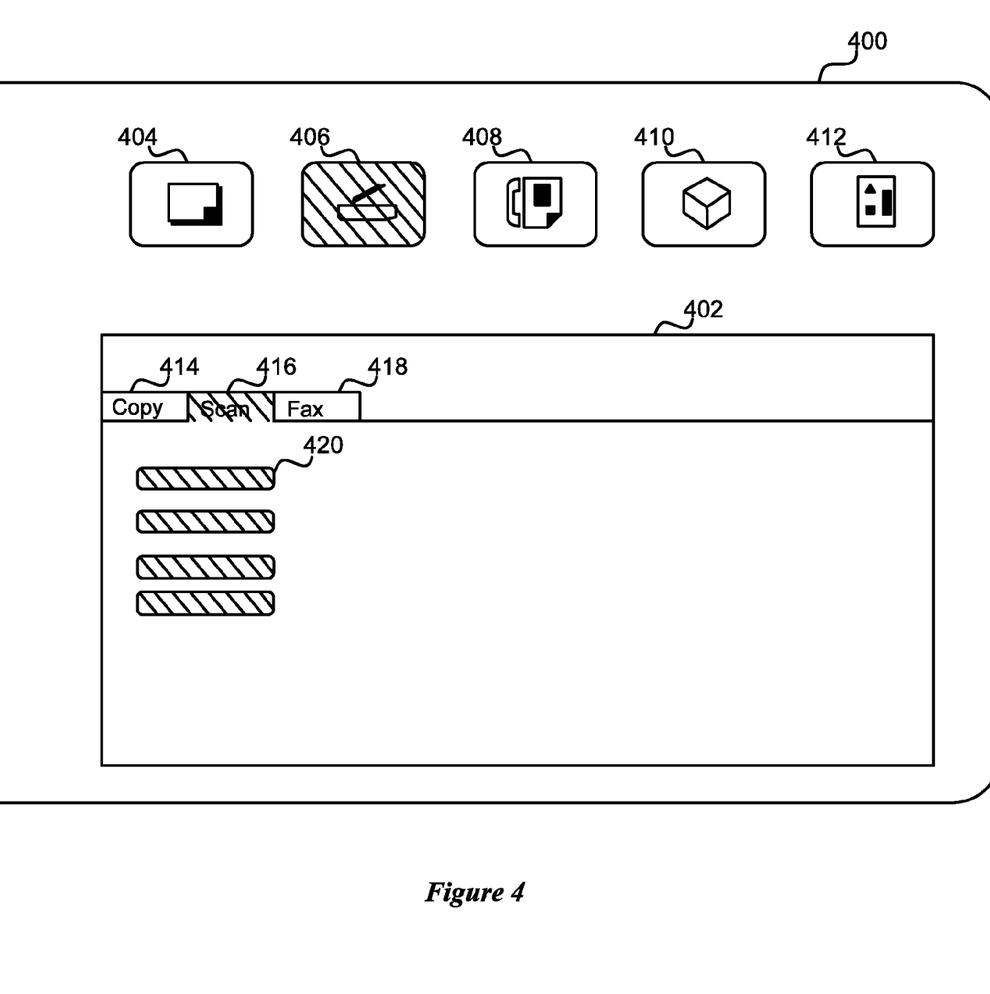
FIG. 4 is a template illustration depicting one embodiment of visually encoding related functions on a multi-function document output device control interface according to the subject application.

Operation of the system 100, according to the preferred embodiment of the subject application, is best understood in conjunction with the user-interface 106 illustrated in FIG. 4 as a template user-interface 400. As will be understood by those skilled in the art, the template user-interface 400 includes a series of hardware buttons, switches, or other physical selection inputs, shown as a copy function button 404, a scan function button 406, a facsimile function button 408, a scan to storage function button 410, and a template function button 412. The skilled artisan will appreciate that the foregoing functions are for example purposes only, and other document processing operations are equally capable of being represented as function buttons, without departing from the scope of the subject application. In accordance with the preferred embodiment of the subject application, the functions buttons 404, 406, 408, 410, and 412 are backlit, as is known in the art. Preferably, the backlighting implemented in accordance with the subject application lights the selected function button 404, 406, 408, 410, or 412, with a color specific to that respective function button 404, 406, 408, 410, and 412. The skilled artisan will appreciate that any suitable means of illuminating the selected function button is capable of being implemented in accordance with the subject application, including, for example and without limitation, light emitting diodes, fluorescent lighting, or the like. The skilled artisan will also appreciate that while referenced herein as hardware buttons, the instant application is capable of using graphical representations of the hardware buttons 404, 406, 408, 410, and 412, without departing from the scope of the subject application.

The template user-interface 400 further includes a visual interface 402, which is suitably adapted to display a variety of sub-functions associated with the function button selected by the associated user. Preferably, the visual interface 402 is a touch-screen display, suitably adapted to display graphical representations of tab windows 414, 416, 418, and icons 420. It will be understood by those skilled in the art that the visual interface 402 is preferably implemented as a color touch-screen display, wherein the selection of one hardware button prompts the display of a subset of functions, i.e., sub-functions, associated with the selected hardware button. The skilled artisan will appreciate that the sub-functions displayed correspond to the main document processing operation selected. Thus, for example and without limitation, when the user selects the copy function button 404, the visual interface 402 illustrates a subset of copy related operations, including, for example and without limitation, size reduction, paper output type, contrast adjustment, number of copies, and the like. Further sub-functions are then capable of including, for example and without limitation, finishing options, and the like.

In accordance with the preferred embodiment of the subject application, the visual interface 402 is capable of implementation as a monochromatic touch-screen display, wherein the sub-functions are displayed to the associated user in a manner that distinguishes a set of sub-functions associated with a main function with a set of sub-functions associated with a different main function. Suitable means of distinguishing include, for example and without limitation, image distortion, grayscale rendering, image hashing, and the like. The skilled artisan will appreciate that such distinguishing means enables a user to view sub-functions as associated with a main function in the absence of a color capable visual interface 402.

In operation, an associated user selects a desired document processing operation to be performed by the document output device 104. Selection is capable of being remotely initiated, such as a private print job sent by the client device 110 to the document output device 104, requiring the user input of a user identification and password to complete the operation, or locally at the user-interface 106 associated with the document output device 104. For purposes of illustration only, the system 100 will now be described according to an associated user physically interacting with the document output device 104, via the associated user-interface 106. Therefore, the document output device 104 receives a main function selection from an associated user when the user selects one of the hardware function buttons 404, 406, 408, 410, or 412. The selected hardware function button, e.g., the copy function button 404, is then backlit by a colored light-emitting diode, or the like. For purposes of this example, the copy function button 404 is backlit by a green color. The document output device 104 then retrieves, from associated memory (not shown) data representing the associated sub-functions and color schemes associated therewith. This first tier of sub-functions, or base functions, is then displayed on the visual interface 402. Continuing with the selection of the copy operation, the base functions displayed on the visual interface 402 as icons 420 suitably include, for example and without limitation, paper output size, paper input size, reduction options, magnification options, contrast options, brightness options, and the like. The skilled artisan will appreciate that each hardware function button 404, 406, 408, 410, and 412 has associated respective base functions particular to that specific document processing operation.

In accordance with the preferred embodiment of the subject application, the visual interface 402 displays these base functions as icons 420 of a green hue, thereby rendering a visual association with the selected main copy function button 404. The skilled artisan will appreciate that not only are the icons 420 capable of being rendering in a hue associated with the main function selected, but the overall theme associated with the visual interface 402 is capable of being rendered in varying shades of the main function color. The user then selects one of the base functions, via selection of the associated icon 420, whereupon second tier functions are retrieved by the document output device 104. Continuing with the copy operation, these second tier functions, include, for example and without limitation, hole punching, stapling, sorting, grouping, and the like. The second tier functions are then displayed in the visual interface 402 as icons 420, having the same visual appearance as the preceding base functions, e.g., the same color. The skilled artisan will appreciate that one aspect of the subject application enables the display of the second tier functions as lighter shade, of the same color, as the preceding base function.

For purposes of explanation, the above example will be described in conjunction with the user selection of the scan function button 406. In accordance with the subject application, the scan function button 406, upon selection, is illuminated with a different color than that of the copy function button 404, i.e., blue instead of green. The backlit blue scan function button 406 informs the user that all scan-based and associated features will be highlighted, shaded, or otherwise distinguished by one or more shades of the color blue. Thus, once the scan function button 406 has been selected by the user, the document output device 104 retrieves sub-functions, base functions, associated with the selected scan operation. The tabs 414, 416, and 418, as well as the base function icons 420 are thereby illustrated to the associated user in a visual appearance variant corresponding to the variant associated with the scan button 406. Thus, the skilled artisan will appreciate that the icons 420 and tabs 414, 416, and 418, are depicted in the visual interface 402 in a shade or shades of blue. The foregoing system 100 and template interface 400 shown in FIGS. 1, 2, 3, and 4 will be better be understood in conjunction with the methodology depicted in FIG. 5.

Figure 5:
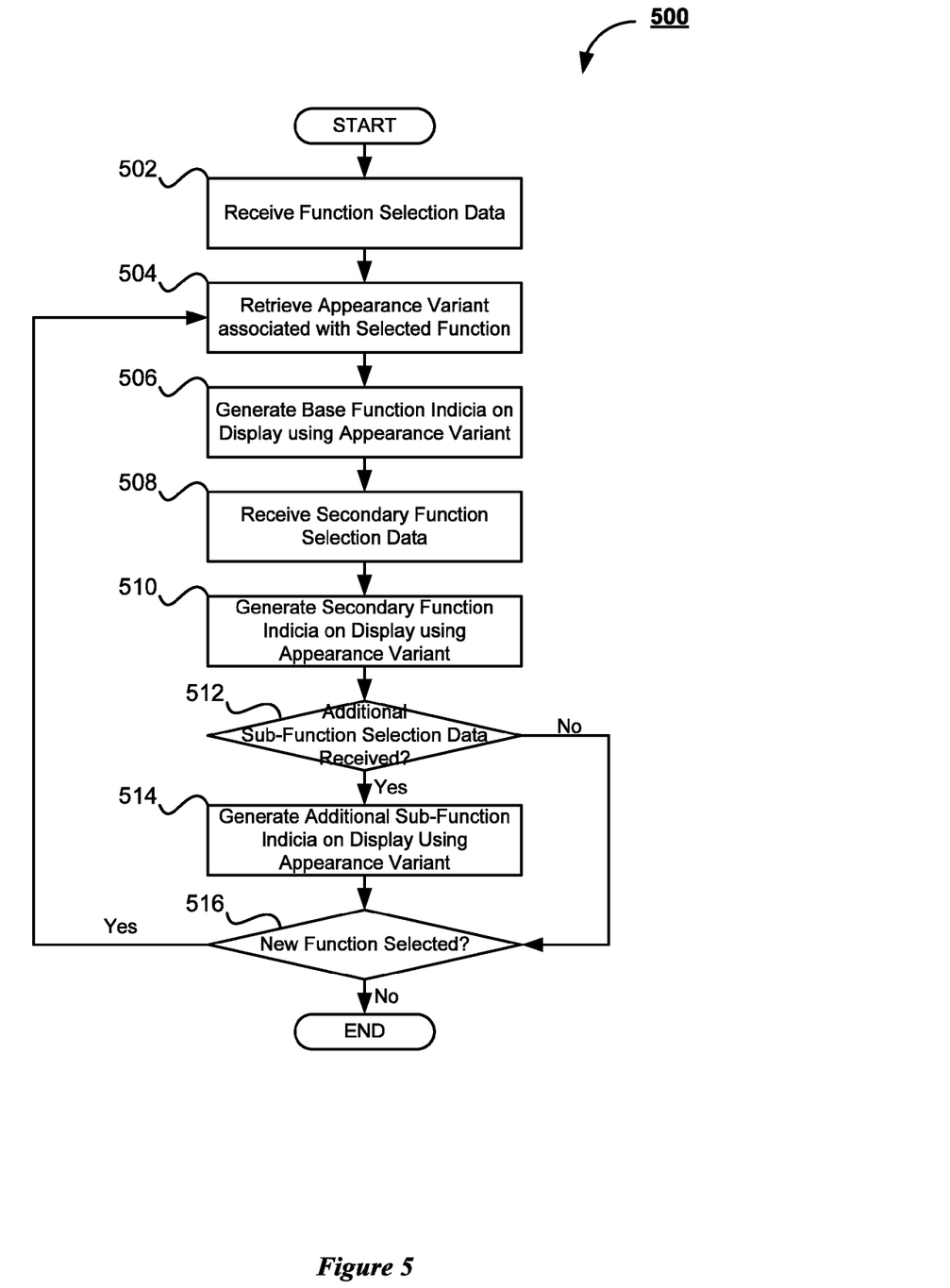
FIG. 5 is a flowchart illustrating the method for visually encoding related functions on a multi-function document output device control interface according to the subject application.

Referring now to FIG. 5, there is shown a flowchart 500 illustrating the method for visually encoding related functions on a multi-function document output device control interface according to the subject application. Beginning at step 502, the document output device 104 receives function selection data via any suitable means known in the art. Preferably, the function selection data is received by the document output device 104 when an associated user selects one of the main function buttons 404, 406, 408, 410, or 412. The document output device 104 then retrieves an appearance variant associated with the selected function at step 504. Those skilled in the art will understand that an appearance variant is any color, grayscale rendering, image distortion, image hashing, or the like, capable of distinguishing one function displayed to the user from another. Preferably, the appearance variant is a color associated with the selected function and only the selected function.

The document output device 104 then generates base function indicia on the visual interface 402 using the retrieved appearance variant at step 506. It will be understood by those skilled in the art that the document output device 104 generates menus representative of sub-functions corresponding to the selected function, in the color or a shade of the color, associated with the main selected function on the visual interface 402. The skilled artisan will further appreciate that these base functions, are capable of being illustrated as the tabs 414, 416, or 418, as well as the icons 420. User selection of any of these base functions is then received by the document output device 104 at step 508. Upon the receipt of secondary function selection data, e.g., a sub-function selected by the user, the document output device 104 generates secondary function indicia on the visual interface 402 using the appearance variant at step 510. Preferably, the visual interface 402 displays second tier functions associated with the selected function using the appearance variant, or color, associated with the main function, i.e., copy, fax, scan, template, store, etc. The second tier functions are preferably depicted on the visual interface 402 as icons 420, or tabs 414, 416, or 418.

A determination is then made at step 512 whether the user has selected an additional sub-function, i.e., whether the selection of one of the secondary functions requires additional user selections. When additional functions are to be displayed in accordance with the selected secondary function, flow proceeds to step 514, whereupon the document output device 104 generates additional function options on the visual interface using the same appearance variant as that of the primary function. A determination is then made at step 516 whether a new primary function has been selected by the user. That is, the document output device 104 determines whether a different function button 404, 406, 408, 410, or 412 has been selected by the user. When such a selection has been made, flow returns to step 504, whereupon the document output device retrieves the appearance variant, e.g., color, associated with the new primary function. When the document output device 104 determines at step 516 that no further function selection data has been received from the associated user, the document output device 104 performs the selected document processing operation corresponding to the selected primary function and associated sub-functions. When no additional functions are required to be displayed, as determined at step 512, the operation terminates with the document output device 104 performing the selected function and associated sub-functions.

The invention extends to computer programs in the form of source code, object code, code intermediate sources and partially compiled object code, or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application is to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for visually encoding related functions on a multi-function document output device control interface comprising:

means adapted for receiving selection data from a dedicated input corresponding to a selected function from a plurality of functions available on a multi-function document output device;

a display generator, the display generator including base function indicia generator means adapted for generating base function indicia on an associated visual display corresponding to the selected function, which indicia has a color variant uniquely corresponding to the selected function; and the display generator further comprising secondary display generator means adapted for generating secondary function indicia on the associated visual display corresponding to a secondary function of the multi-function document processing device corresponding to the selected function, the secondary function indicia having the same color variant visually corresponding to that color variant corresponding to the selected function corresponding thereto.

2. The system for visually encoding related functions on a multi-function document output device control interface of claim 1, wherein each color variant corresponds to a selected color coding.

3. The system for visually encoding related functions on a multi-function document output device control interface of claim 1, wherein each color variant corresponds to a selected, corresponding modification to each of the base function indicia and the secondary function indicia.

4. The system for visually encoding related functions on a multi-function document output device control interface of claim 3, wherein each indicia includes an icon representative of a corresponding function associated therewith.

5. The system for visually encoding related functions on a multi-function document output device control interface of claim 4, wherein each color variant corresponds to a selected color coding.

6. A method for visually encoding related functions on a multi-function document output device control interface comprising the steps of:

receiving selection data from a dedicated input corresponding to a selected function from a plurality of functions available on a multi-function document output device;

generating base function indicia on an associated visual display corresponding to the selected function, which indicia has a color variant corresponding to the selected function; and generating secondary function indicia on the associated visual display corresponding to a secondary function of the multi-function document processing device corresponding to the selected function, the secondary function indicia having the same color variant visually corresponding to that color variant corresponding to the selected function corresponding thereto.

7. The method for visually encoding related functions on a multi-function document output device control interface of claim 6, wherein each color variant corresponds to a selected color coding.

8. The method for visually encoding related functions on a multi-function document output device control interface of claim 6, wherein each color variant corresponds to a selected, corresponding modification to each of the base function indicia and the secondary function indicia.

9. The method for visually encoding related functions on a multi-function document output device control interface of claim 8, wherein each indicia includes an icon representative of a corresponding function associated therewith.

10. The method for visually encoding related functions on a multi-function document output device control interface of claim 9, wherein each color variant corresponds to a selected color coding.

* * * * *